(12) United States Patent
Ihata et al.

(10) Patent No.: US 7,646,123 B2
(45) Date of Patent: Jan. 12, 2010

(54) VEHICLE ALTERNATOR

(75) Inventors: Kouichi Ihata, Okazaki (JP); Atsushi Umeda, Okazaki (JP); Tsutomu Shiga, Nukata-gun (JP)

(73) Assignee: Denso Corporation, Kariya (JP)

( * ) Notice: Subject to any disclaimer, the term of this patent is extended or adjusted under 35 U.S.C. 154(b) by 431 days.

(21) Appl. No.: 11/546,956

(22) Filed: Oct. 13, 2006

(65) Prior Publication Data

US 2007/0102932 A1    May 10, 2007

(30) Foreign Application Priority Data

Nov. 10, 2005    (JP)    ............................. 2005-325594

(51) Int. Cl.
*H02K 49/00*    (2006.01)

(52) U.S. Cl. .......................................... 310/96; 290/31
(58) Field of Classification Search .................. 310/96, 310/83; 290/31
See application file for complete search history.

(56) References Cited

U.S. PATENT DOCUMENTS

| | | | | |
|---|---|---|---|---|
| 3,221,172 A | * | 11/1965 | Rolison | ...................... 290/4 R |
| 4,585,949 A | | 4/1986 | Takahashi | |
| 4,862,770 A | * | 9/1989 | Smith | ......................... 475/324 |
| 5,266,836 A | * | 11/1993 | Sousa | ........................... 290/31 |
| 2004/0161340 A1 | | 8/2004 | Rimkus et al. | |

FOREIGN PATENT DOCUMENTS

| | | |
|---|---|---|
| DE | 34 36 411 A1 | 4/1985 |
| DE | 102 46 763 A1 | 4/2003 |
| DE | 103 06 418 A1 | 8/2004 |
| JP | A 06-105513 | 4/1994 |

OTHER PUBLICATIONS

Translation of German Office Action issued on Feb. 7, 2008 in German Application No. 10 2006 052 880. 8-22.

* cited by examiner

*Primary Examiner*—Dang D Le
(74) *Attorney, Agent, or Firm*—Oliff & Berridge, PLC.

(57) ABSTRACT

A vehicle alternator for generating electric power is driven by an engine mounted on a vehicle driven through a driving belt. The alternator has a pulley part joined to and directly receiving a driving force from the engine through the driving belt, a field magnet part located in separation from the pulley part, a rotation speed changing part placed between the pulley part and the field magnet part. The rotation speed changing part converts the number of revolutions between the pulley part and the field magnet part. The rotation speed changing part decreases a speed changing ratio "S" according to increasing of the number of revolutions of the engine, where the speed changing ratio "S" is obtained by dividing the number of revolutions of the field magnet part by the number of revolutions of the pulley part.

6 Claims, 6 Drawing Sheets

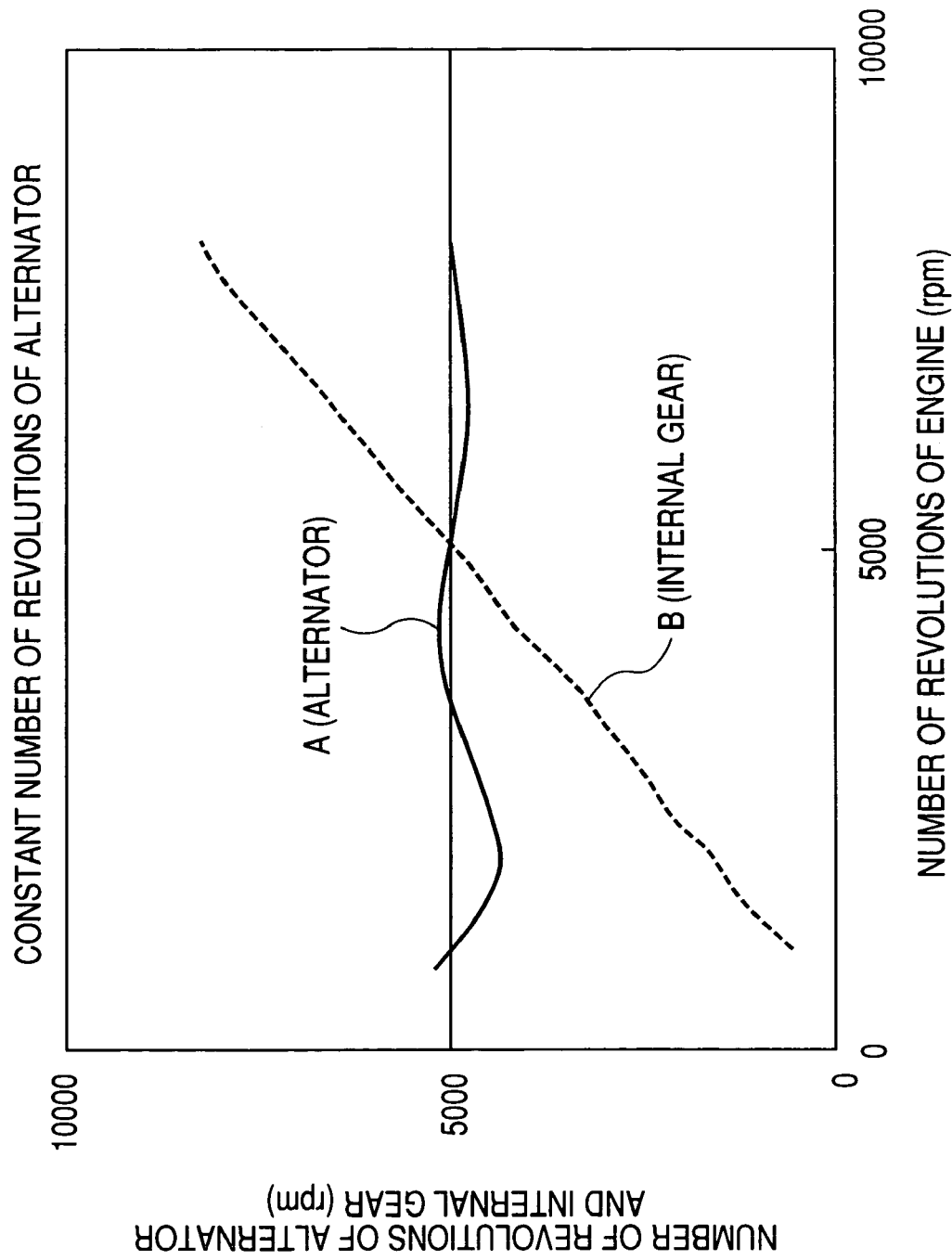

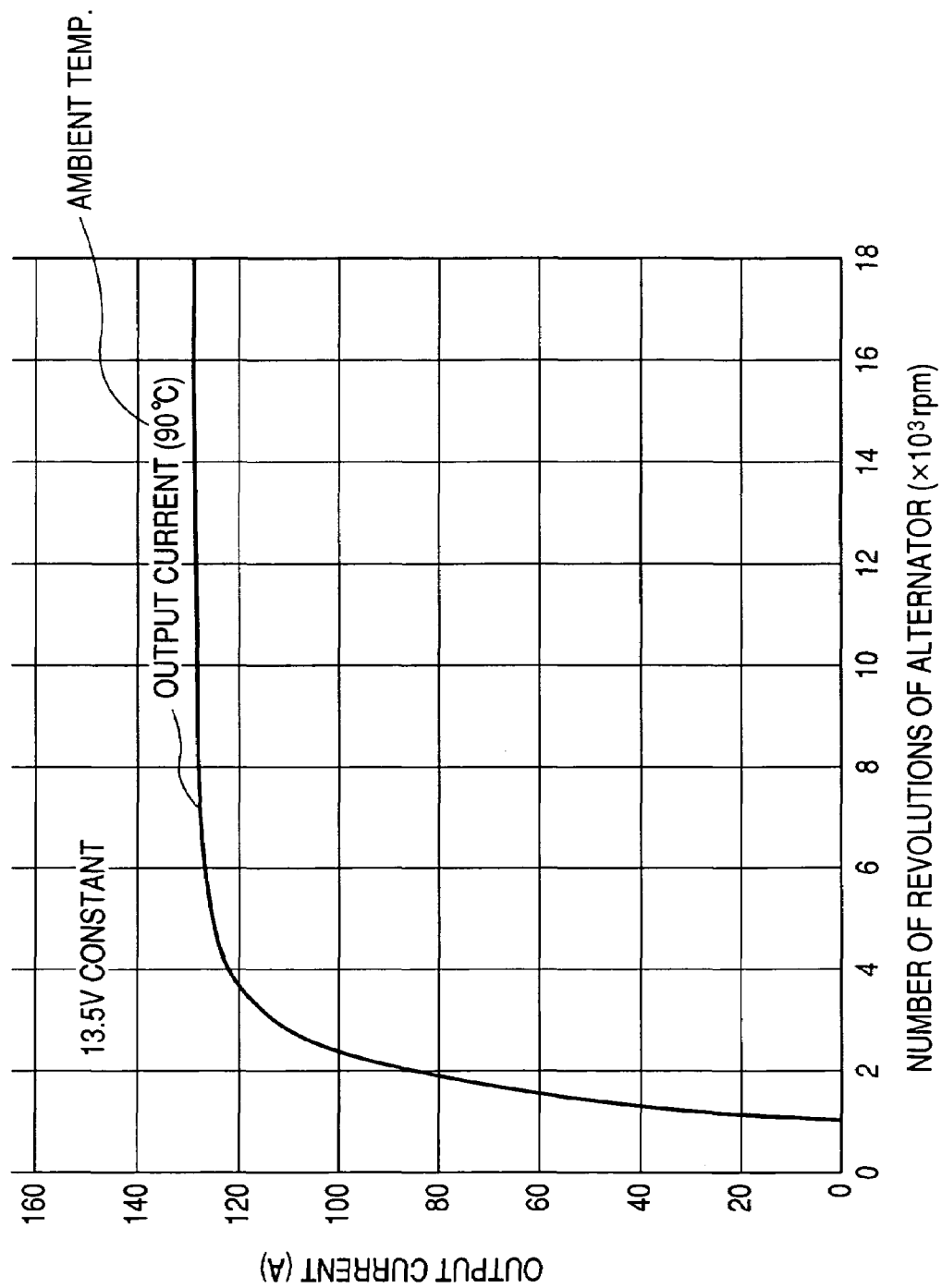

VEHICLE ALTERNATOR

CROSS-REFERENCE TO RELATED APPLICATIONS

This application is related to and claims priority from Japanese Patent Application No. 2005-325594 filed on Nov. 10, 2005, the contents of which are hereby incorporated by reference.

BACKGROUND OF THE INVENTION

1. Field of the Invention

The present invention relates to a vehicle alternator or an electric power generator to be mounted on a vehicle such as a passenger car and a truck.

2. Description of the Related Art

In general, a vehicle alternator is driven by an engine such as an internal combustion engine mounted on a vehicle through a driving belt that joins the vehicle alternator and the engine. Such a vehicle alternator is driven by the rotary force provided from the engine through the driving belt in order to generate an electric power.

A speed increasing ratio of the vehicle alternator is determined based on a ratio between a groove diameter of a crankshaft pulley and a groove diameter of a pulley of the vehicle alternator.

The vehicle alternator is usually driven at the speed increasing ratio of approximately two or three times the number of revolutions of the vehicle engine. In general, the number of revolutions of the vehicle engine is within a range of approximately 700 rpm (revolutions per minute) to 7,000 rpm (as the maximum value). Because the speed increasing ratio of the vehicle alternator is approximately two or three times of that of the vehicle engine, the number of revolutions of the vehicle alternator takes a wide range of approximately 14,000 rpm to 21,000 rpm (as the maximum value).

However, the distribution of the number of revolutions of a common vehicle engine has approximately 700 rpm in idling condition which is 40% of the whole and also has approximately 1,300 rpm in a low speed revolution which is 50% of the whole during actual running of the vehicle such as 10-15 mode that is a typical running condition in view of the calculation of fuel consumption. That is, because the low speed of revolutions of the vehicle engine from the number of revolutions in idling condition to 1,300 rpm takes approximately 90% of the whole, the actual vehicle running takes the number of revolutions of not more than 1,300 rpm.

Accordingly, this means that it is necessary to keep a large amount of electric power in a vehicle alternator when the vehicle alternator is using a low speed of revolution.

FIG. 6 is a view showing a typical output characteristic of a widely used vehicle alternator. FIG. 6 indicates that the vehicle alternator has a low electrical power generation capacity during a low speed of revolution. In order to increase the magnitude of electric power generation during the low speed of revolution, in other words, in order to enhance the electric power generation capability during the low speed of revolution, it is necessary to either increase the speed increasing ratio by using a simple speed-increasing mechanism obtained by fixing the internal gear, or increase a volume of the vehicle alternator. Japanese patent laid open publication JP H6-105513 has disclosed such a conventional technique to increase the speed increasing ratio of a vehicle alternator. (see pages 2 to 3, and FIG. 1 to FIG. 2 in JP H6-105513)

However, although a high capability of electric power generation of the vehicle alternator is achieved on increasing the speed increasing ratio thereof as the former case, this manner decreases the lifetime of wear parts such as brushes and bearings which form the vehicle alternator, and further serves to break rotating components such as cooling fans because the vehicle alternator rotates at a high speed. In addition, because iron loss to heat the components of the vehicle alternator is generally in proportion to the square of a power generation frequency (as the number of revolutions), the heating value of the vehicle alternator at a higher rotating speed is greater than that at a lower rotating speed even if in generation of the same amount of electric power.

Thus, the vehicle alternator at a higher rotating speed causes various troubles such as thermal stress and wear stress, and those troubles decrease the reliability of the vehicle alternator. If a vehicle alternator consists of various components of high reliability and durability in order to avoid those troubles and drawbacks, the manufacturing cost of the vehicle alternator is increased because the cost of each assembling components with high reliability and durability is generally high.

On the other hand, the latter case to increase the volume of the vehicle alternator brings to decrease or deteriorate the mounting flexibility of a vehicle and to introduce the difficulty of designing the engine to be assembled to the vehicle, and to break a stay on which various components are mounted because the total weight of the vehicle alternator is increased. This decreases the reliability of the vehicle. In order to eliminate the deterioration of the vehicle reliability, each part and component are reinforced, the manufacturing cost is also increased, similar to the case of increasing the durability and thermal resistance of each component. As a result, this trial brings to increase the manufacturing cost of the vehicle alternator.

SUMMARY OF THE INVENTION

It is an object of the present invention to provide a vehicle alternator of a high reliability and of bringing the reduction in manufacturing cost.

To achieve the above purposes, the present invention provides a vehicle alternator for generating electric power to be driven by an engine through a driving belt. The vehicle alternator has a pulley part, a field magnet part, and a rotation speed changing part. The pulley part is joined to the engine through the driving belt and directly receives a driving force supplied from the engine through the driving belt. The field magnet part is located in separation from the pulley part in the vehicle alternator. The rotation speed changing part is joined to the pulley part and the field magnet part and located between the pulley part and the field magnet part and converts the number of revolutions between the pulley part and the field magnet part. The rotation speed changing part is configured to reduce a speed changing ratio "S" according to increasing of the number of revolutions of the engine. The speed changing ratio "S" is obtained by dividing the number of revolutions of the field magnet part by the number of revolutions of the pulley part.

It is possible to reduce revolution stress caused by centrifugal force and temperature rising stress caused by iron loss and the like in the vehicle alternator, and to increase the reliability of the vehicle alternator because the increase of the number of revolutions of the field magnet part can be suppressed by reducing the speed changing ratio "S" according to the increase of the number of revolutions of the engine. In addition, because this feature can eliminate the necessity to use high expensive components of high durability and anti-thermal resistance, the present invention provides the vehicle alternator at a low manufacturing cost. Further, because it is possible to set the speed changing ratio "S" to a high value during a low speed of revolution of the engine, it is thereby possible to keep adequate amount of the electric power generation in the low speed of revolution of the engine.

According to another aspect of the present invention, it is preferred to set the speed changing ratio "S" so that the number of revolutions of the field magnet part becomes a constant value when the number of revolutions of the engine exceeds a specified value. Because the magnitude of centrifugal force and the thermal stress to be applied to each component of the vehicle alternator is thereby reduced to a specified value or less, it is possible to prevent the excess amount of centrifugal force and the excess thermal stress applied to the vehicle alternator and possible to enhance the reliability of the vehicle alternator certainly.

Further, according to another aspect of the present invention, it is preferred to set the speed changing ratio "S" so that the number of revolutions of the field magnet part is reduced according to the increasing number of revolutions of the engine. It is thereby possible to reduce the centrifugal force and the thermal stress applied to each component of the vehicle alternator according to increasing the number of revolutions of the engine. In general, because the magnitude of vibration of the engine is increased according to increasing the speed of revolutions of the engine, it is possible to reduce the combination stress composed of vibration stress, centrifugal force stress, and thermal stress. This feature of the present invention further enhances the reliability of the vehicle alternator.

Still further, according to another aspect of the present invention, it is preferred to set the speed changing ratio "S" based on an instruction to be supplied from an external control unit mounted on a vehicle and separated from the vehicle alternator. It is thereby possible to set the speed changing ratio "S" based on the vehicle running state and the battery condition. As a result, because the electric power generation capability of the vehicle alternator can be freely changed, it is possible to design the minimum sized vehicle alternator while keeping the necessary amount of the electric power generation. The present invention can provide the vehicle alternator of a high reliability in a low manufacturing cost.

Furthermore, according to another aspect of the present invention, it is preferred to have the rotation speed changing part composed of a combination of a sun gear, planetary gears, an internal gear, and a driving mechanism. It is thereby possible to fix and operate the internal gear at a specified speed of revolution by the driving mechanism and possible to set the speed changing ratio "S" to a specified value.

In addition, according to another aspect of the present invention, it is preferred that the driving mechanism is an electric motor whose operation is controlled by an instruction transferred from the external control unit such as an engine control unit (ECU). It is thereby possible to easily control the number of revolutions of the internal gear in the rotation speed changing part by the electric motor and further to easily change the speed changing ratio "S" based on the operation of the electric motor controlled by the ECU.

BRIEF DESCRIPTION OF THE DRAWINGS

A preferred, non-limiting embodiment of the present invention will be described by way of example with reference to the accompanying drawings, in which:

FIG. 5 shows a relationship between the number of revolutions of an engine determined by another gear combination and the number of revolutions of the vehicle alternator of the embodiment; and FIG. 6 is a view showing an output characteristic of a typical vehicle engine.

DETAILED DESCRIPTION OF THE PREFERRED EMBODIMENTS

Figure 1:
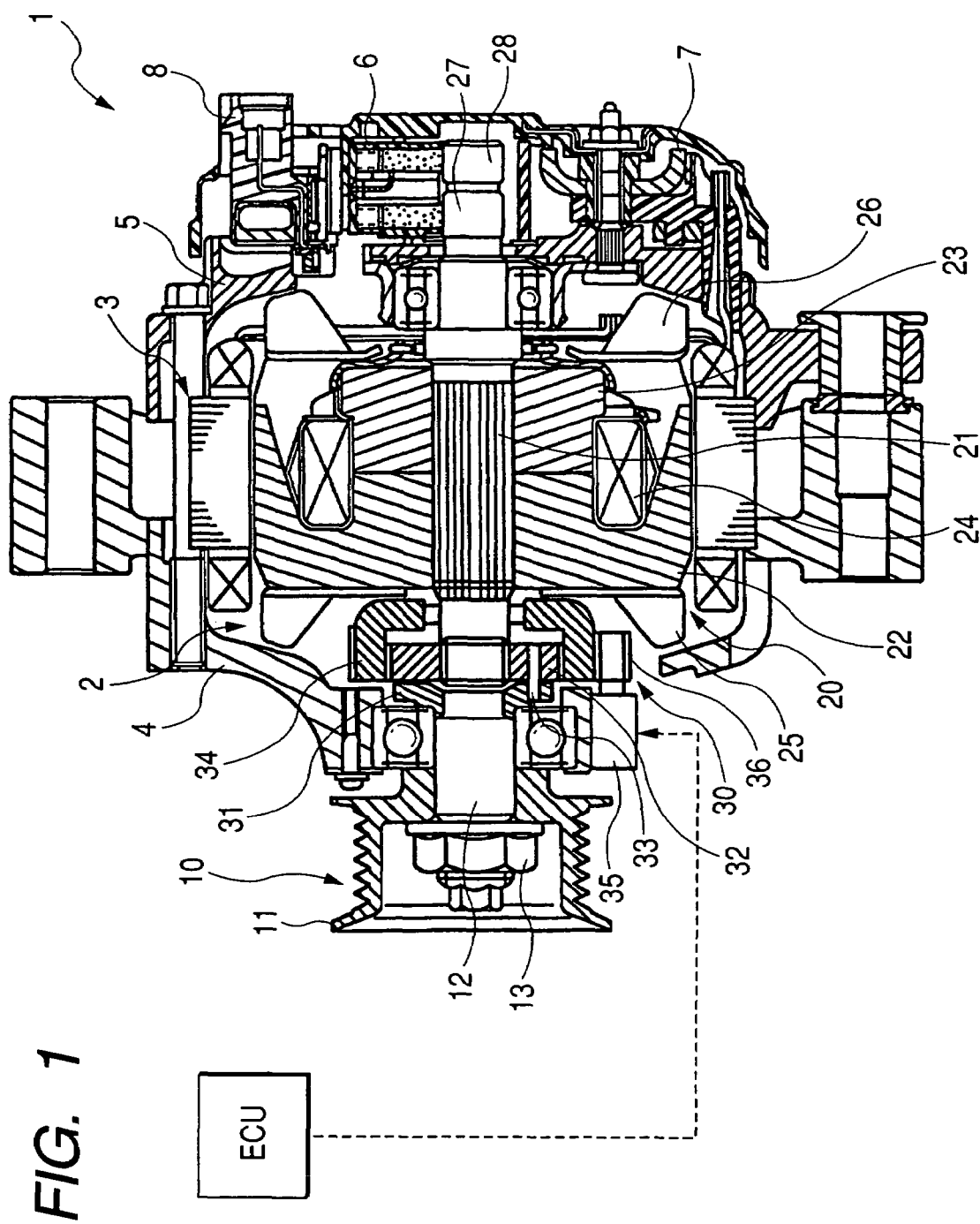
FIG. 1 is a sectional view of an entire configuration of a vehicle alternator according to an embodiment of the present invention.

Hereinafter, various embodiments of the present invention will be described with reference to the accompanying drawings. In the following description of the various embodiments, like reference characters or numerals designate like or equivalent component parts throughout the several of the diagrams.

Embodiment

A description will be given of the vehicle alternator according to the embodiment of the present invention with reference to FIG. 1 to FIG. 5.

FIG. 1 is a sectional view of an entire configuration of the vehicle alternator according to the embodiment of the present invention. As shown in FIG. 1, the vehicle alternator 1 has a rotor 2, a stator 3, a housings 4 and 5, a brush device 6, a rectify device 7, and a voltage regulator 8.

The rotor 2 has a pulley part 10, a field magnet part 20 separated from the pulley part 10, a rotation speed changing part 30 configured to convert the rotation speed between the pulley part 10 and the field magnet part 20.

The pulley part 10 has a pulley 11, a pulley rotating shaft 12, and a nut 13. The pulley rotating shaft 12 is configured to transmit to the field magnet part 20 the driving force which is supplied from the engine (such as an internal combustion engine, omitted from the drawings) to the pulley 11 through a driving belt (omitted from the drawings). The pulley 11 is tightly fastened and fixed to the pulley rotating shaft 12.

The field magnet part 20 has a field magnet rotating shaft 21, a front pole core 22 and a rear pole core 23, a field coil 24, cooling fans 25 and 26, slip rings 27 and 28, and others. In the field magnet part 20, both of the front pole core 22 and the rear pole core 23 have plural craws and accommodate the field coils 24 of a cylindrical shape therein. The field magnet rotating shaft 21 penetrates the center of each of the field coil 24 and the front and rear pole cores 22 and 23. The cooling fan 25 is attached to the end surface of the front pole core 22 by welding. Similarly, the cooling fan 26 is also attached to the end surface of the rear pole core 23. The slip rings 27 and 28 are formed at both the ends of the field coil 24 at the rear end of the field magnet rotating shaft 21. The slip rings 27 and 28 are connected electrically to both ends of the field coil 24.

The rectifier device 7 rectifies a three-phase current and provides a field current to the field coil 24 through the brushes of the brush device 6 and the slip rings 27 and 28. In assembling, the brushes of the brush device 6 are pushed to the slip rings.

Figure 2:
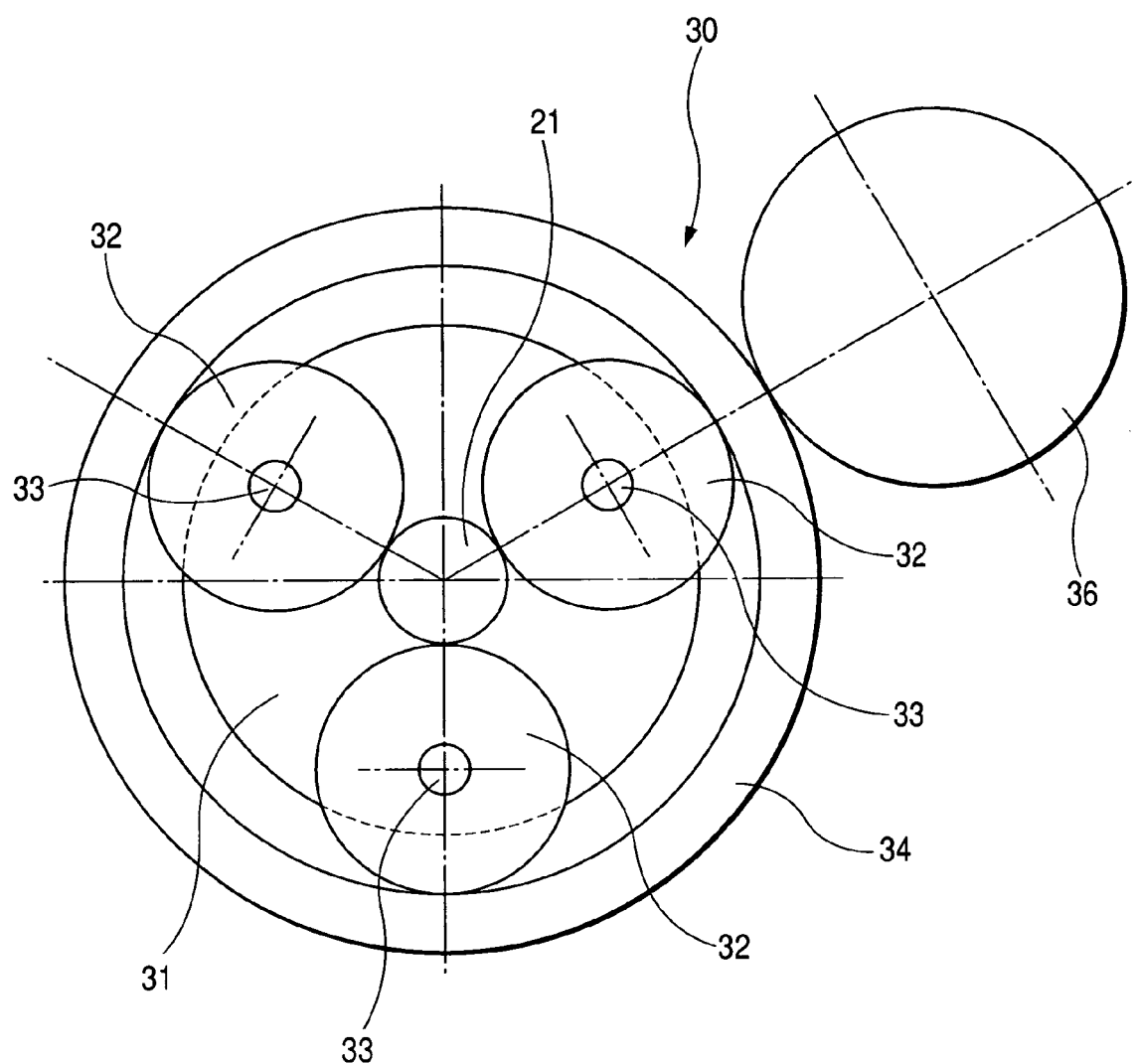
FIG. 2 is a sectional view of a rotation speed changing device built in the vehicle alternator of the embodiment shown in FIG. 1.
Figure 3:
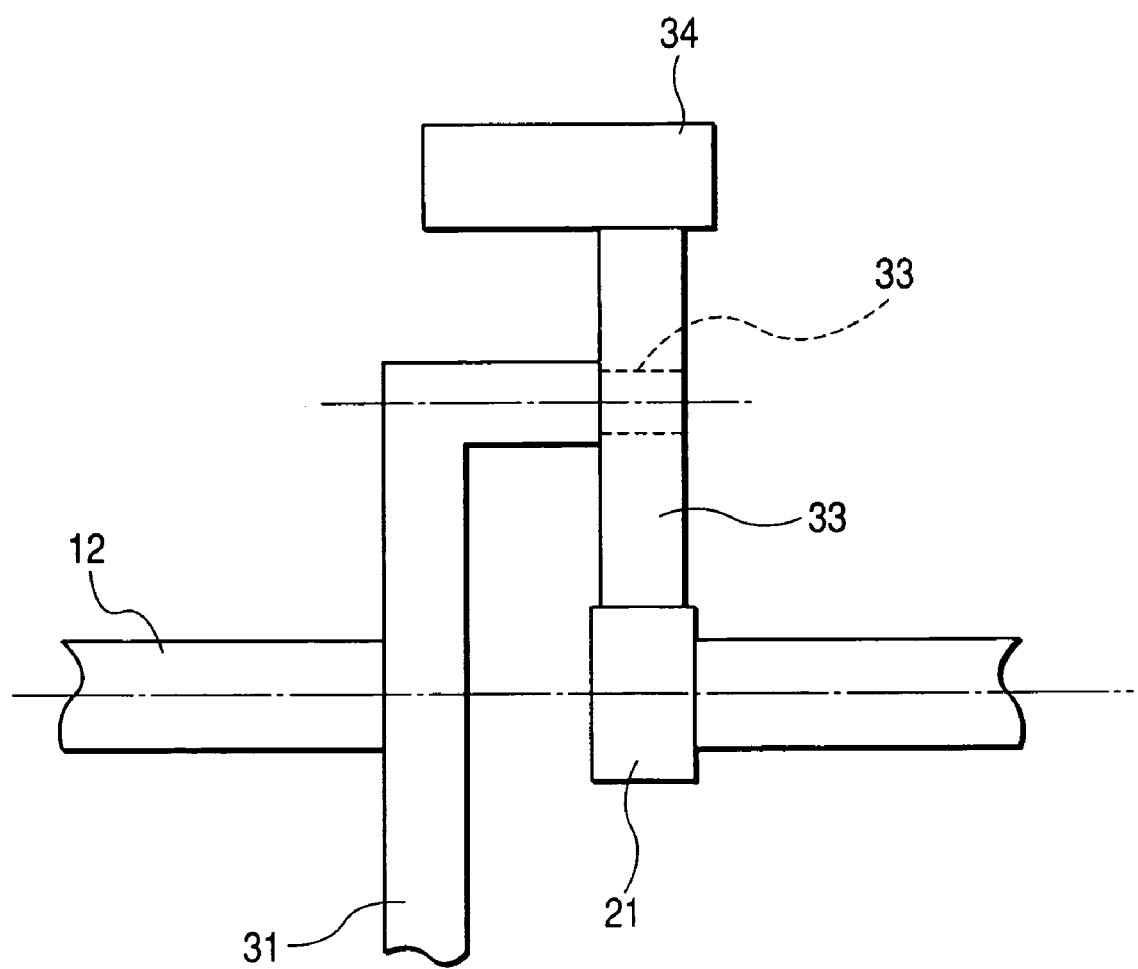
FIG. 3 is a schematic view of the rotation speed changing device shown in FIG. 2.

The rotation speed changing part 30 is composed of a planetary gear device. FIG. 2 is a sectional view of the rotation speed changing part 30 built in the vehicle alternator 1 of the embodiment shown in FIG. 1. FIG. 3 is a schematic view of the rotation speed changing part 30 shown in FIG. 2.

The rotation speed changing part 30 is composed of the planetary gear device having a disk shaped carry 3 fixed to the pulley rotating shaft 12, three planetary gears 32, connection pins 33, an internal gear 34 mounted on the outside of the three planetary gears 32, a driving gear 36, and an external motor 35 configured to directly drive the internal gear 34 through the driving gear 36. Each of the planetary gears 32 is fixed with a capability of rotation to a carry 31 through each connection pin 33. At the center of the three planetary gears 32 a front part of the field magnet rotating shaft 21 is mounted. The front part of the field magnet rotating shaft 21 acts as a sun gear. The detailed configuration and feature of the rotation speed changing part 30 will be explained later.

The stator 3 acts as an armature having plural slots on which three stator windings are wound. The plural slots are formed on a stator core of the stator 3. The rectifier device 7 rectifies the three-phase output current from the stator windings and provides a rectified direct current.

Both of a front housing 4 and a rear housing 5 accommodate the rotor 2 and the stator 3. The rotor 2 is supported by the front and rear housings 4 and 5, having the ability to rotate around the pulley rotating shaft 12 or the field magnet rotating shaft 21.

Although the output voltage of the vehicle alternator 1 is changed according to the magnitude of electric loads and the amount of electrical power generation, the voltage regulator 8 keeps an output voltage of the vehicle alternator 1 constant by controlling the amount of the field current flowing through the field coil 24.

In the vehicle alternator 1 having the above configuration, the driving force of the engine is transmitted to the pulley rotating shaft 12 through the driving belt connected to the crankshaft pulley of the engine, and the rotation speed changing device 30 converts the number of revolutions of the pulley rotating shaft 12. As a result, the field magnet rotating shaft 21 rotates at the number of revolutions obtained by a specified speed changing ratio S which is in proportion to the number of revolutions of the pulley rotating shaft 12. The field magnet rotating shaft 21 in the field magnet part 20 rotates at the number of revolutions converted by the specified speed changing ratio S, and the vehicle alternator 1 generated electric power and outputs the output current.

Next, a description will now be given of a rotation speed changing mechanism (or the rotation speed increasing and decreasing mechanism) of the rotation speed changing device 30 built in the vehicle alternator 1 according to the embodiment of the present invention.

In a speed increasing mechanism incorporated in a conventional vehicle alternator, an internal gear has a constant speed increasing ratio because the internal gear is fixed to an external device of the vehicle alternator. On the contrary, the rotation speed changing device 30 is built in the vehicle alternator 1 according to the embodiment of the present invention. The rotation speed changing device 30 has the internal gear 34 that is supported in the vehicle alternator 1 with a capability of rotation. This configuration has one of the features of the present invention and different from the configuration of conventional vehicle alternators.

The vehicle alternator 1 is capable of changing to an optional value the speed changing ratio S that is obtained by dividing the number of revolutions of the field magnet part 20 by the number of revolutions of the pulley part 10. In an actual example, the vehicle alternator 1 of the embodiment is so controlled that the speed changing ratio S is decreased according to the increase of the number of revolutions of the engine. Thereby, when the internal gear 34 is reversely rotated at a specified number of revolutions, it is thereby possible to stop the rotation of the field magnet rotating shaft 21.

It is possible to control the number of revolutions of the planetary gears 32 by changing the number of revolutions of the internal gear 34. In addition, the number of revolutions of the internal gear 34 is controlled based on the driving force applied through the driving gear 36 mounted on an external motor 35 as a part of the driving mechanism.

That is, the control of the number of revolutions of the external motor 35 enables the determination of the number of revolutions of the internal gear 34 with which the speed changing ratio S of the entire of the rotation speed changing device 30, namely, of the field magnet rotating shaft 21 of the field magnet part 20 of the vehicle alternator 1 is determined.

The driving force is transmitted from the pulley part 10 to the field magnet part 20 through at first the pulley rotating shaft 12, the carry 31 and the planetary gears 32 in the planetary gear mechanism of the rotation speed changing device 30, and a field magnet rotating shaft 21, in order.

Thus, it is possible to freely determine the number of revolutions of the field magnet part 20 of the vehicle alternator 1 to the number of revolutions of the engine.

In the embodiment of the present invention, it is possible to easily change the speed changing ratio S under the control to the driving force of the external motor 35 because the number of revolutions of the internal gear 34 is controlled, namely, is freely changed by using the driving force supplied from the external motor 35. In particular, because the number of revolutions of the external motor 35, namely, the speed changing ratio S is controlled by an engine control unit (ECU, omitted from the drawings) as an external control unit, it is possible to freely change the speed changing ratio S according to the running condition of the vehicle and the condition of a battery (omitted from the drawings). As a result, because the generation capability of the electric power of the vehicle alternator 1 is freely changed, it is possible to reduce the entire size and the volume of the vehicle alternator 1 while keeping the required generation amount of the electric power. Thus, the present invention can provide the vehicle alternator with a high reliability and a low manufacturing cost.

ACTUAL EXAMPLES

Next, a description will now be given of actual examples of setting a gear ratio of the gears in the rotation speed changing device 30.

(First Example of Gear Ratio)

First example of setting a gear ratio is as follows:
- The number of teeth of each planetary gear 32 is 20;
- The number of teeth of the internal gear 34 is 50; and
- The number of teeth of field magnet rotating shaft 21 is 10.

Figure 4:
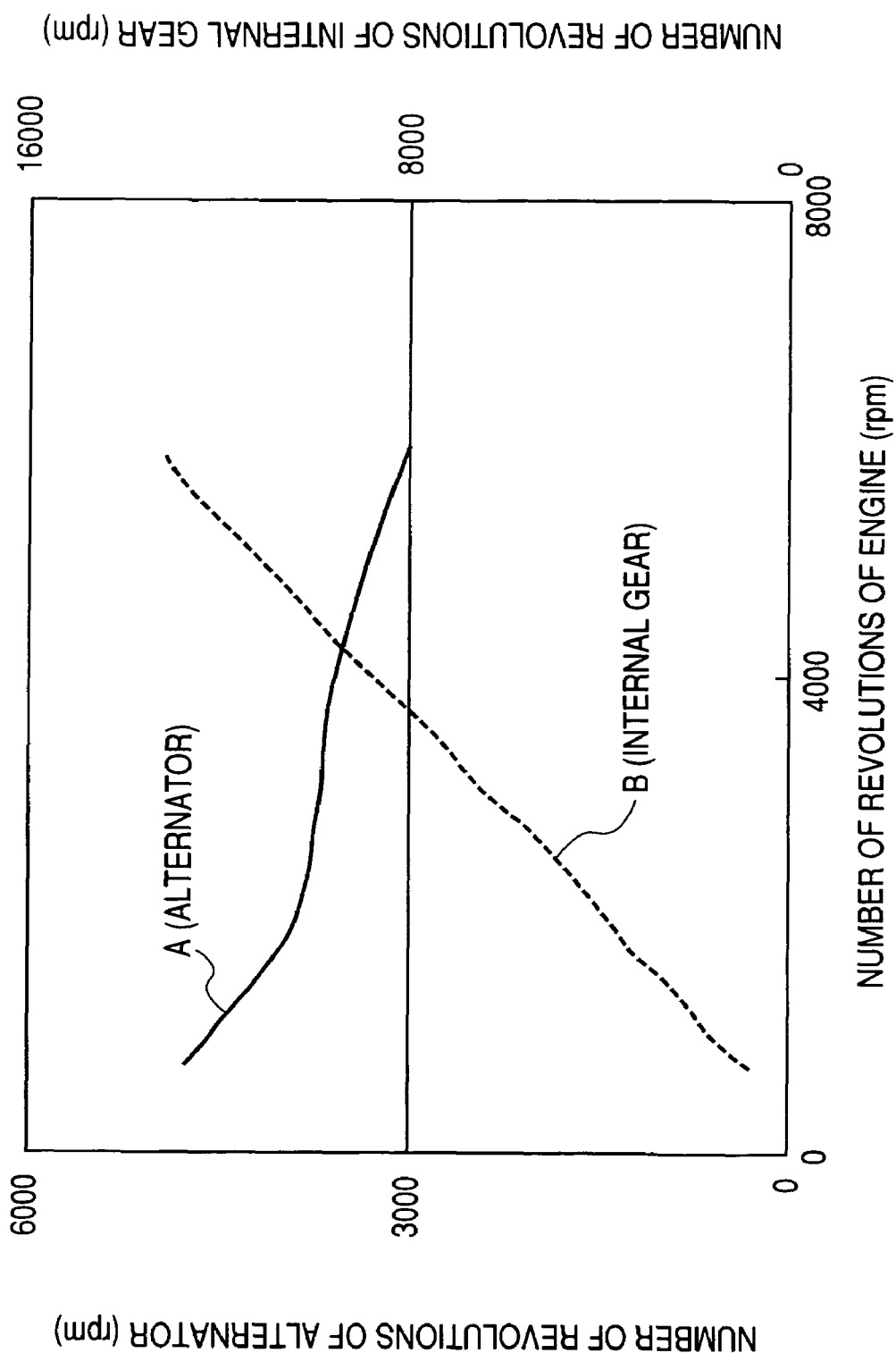
FIG. 4 shows a relationship between the number of revolutions of an engine determined by a specified gear combination and the number of revolutions of the vehicle alternator of the embodiment.

FIG. 4 shows a relationship between the number of revolutions of the engine determined by the specified gear ratio described in the first example of setting the gear ratio and the number of revolutions of the vehicle alternator 1 of the embodiment.

In FIG. 4, the characteristic A (Alternator 1) designated by the solid line shows the relationship between the number of revolutions of the vehicle alternator 1 and the number of revolutions of the engine. The characteristic B (Internal gear 34) designated by the dotted line shows the relationship between the number of revolutions of the internal gear 34 and the number of revolutions of the engine. The relationship B realizes the relationship designated by the characteristic A.

The speed increasing mechanism of the conventional technique (for example, as disclosed in JP H6-105513) uses a fixed gear ratio, in other words, uses a fixed speed increasing ratio of the internal gear, for example, 6 times (as a constant value). This speed increasing ratio is obtained by the following equation (1).

Speed increasing ratio=(Number of gear teeth of the internal gear 34/Number of gear teeth of the field magnet rotating shaft 21)+1     (1).

That is, the speed increasing ratio becomes 6(=(50/10)+1).

On the contrary, according to the embodiment of the present invention, it is possible to freely set the speed increasing ratio by adjusting the number of revolutions of the internal gear 34 driven by the external motor (as an electric motor controlled by the ECU). For example, when a pulley ratio is 2 and the number of revolutions of the internal gear 34 is keep within a range of 962 rpm to 13,800 rpm under the first example of gear ratio described above, as shown in FIG. 4, the number of revolutions of the field magnet rotating shaft 21, namely the number of revolutions of the field magnet part 20 to the number of revolutions of the pulley 11 becomes 4,790 rpm during engine idling, and becomes 3,000 rpm in the maximum number of revolutions of the engine 1, where the pulley ratio is the speed increasing ratio of the pulley 11 to the number of revolutions of the engine.

Thus, the vehicle alternator 1 of the embodiment of the present invention is capable of decreasing the number of revolutions of the field magnet part 20 even if the number of revolutions of the engine 1 is increased.

Table 1 shows the relationship of FIG. 4 between the number of revolutions of the vehicle alternator 1 and the number of revolutions of the engine. Table 1 further shows a comparison result of the vehicle alternator 1 of the embodiment and the conventional vehicle alternator.

In Table 1, the speed increasing ration of the conventional case is 6.

TABLE 1

| | | Number of revolutions of engine (rpm) | | | |
|---|---|---|---|---|---|
| | | 750 | 2,000 | 4,000 | 6,000 |
| Number of revolutions of alternator | Conventional case | 9,000 | 24,000 | 48,000 | 72,000 |
| | Present invention | 4,760 | 3,900 | 3,600 | 3,000 |
| Number of revolutions of internal gear | Conventional case | 0 | 0 | 0 | 0 |
| | Present invention | 962 | 4,020 | 8,880 | 13,800 |

According to the vehicle alternator 1 of the embodiment as shown in Table 1, it is possible to adjust the amount of the electric power generation by changing the number of revolutions of the vehicle alternator 1 during the low speed of revolutions of the engine because it can be so controlled that the number of revolutions of the field magnet rotating shaft 21 of the field magnet part 20 is changed by adjusting the speed changing ratio S of the field magnet rotating shaft 21 in the field magnet part 20 to the increase of the number of revolutions of the engine. That is, the amount of the electric power generated by the vehicle alternator 1 can be increased by increasing the number of revolutions of the field magnet rotating shaft 21 of the field magnet part 20 in the vehicle alternator 1 during a low speed revolution of the engine because it can be so controlled that the number of revolutions of the field magnet rotating shaft 21 of the field magnet part 20 is increased by increasing the speed changing ratio S of the field magnet rotating shaft 21 of the field magnet part 20 to the decreasing of the number of revolutions of the engine. Further, it is possible to suppress or reduce the number of revolutions of the field magnet rotating shaft 21 of the field magnet part 20 when the engine rotates at a high speed. This can prevent various rotating parts (in particular, the parts forming the field magnet part 20) forming the vehicle alternator 1 from centrifugal force to be applied to those rotating parts. Therefore the present invention can reliably provide the vehicle alternator 1. Still further, it is possible to prevent the temperature rise caused by the iron loss of the vehicle alternator 1.

In general, although various stresses such as centrifugal force, heating, and vibration are applied to the vehicle alternator 1 when the engine rotates at a high speed, the vehicle and the engine mounted on the vehicle are strongly vibrated, it is possible to reduce the centrifugal force stress and the heating stress by suppressing the number of revolutions of the field magnet rotating shaft 21 of the field magnet 20. This extremely increases the reliability of the vehicle alternator 1. Thus, the present invention can provide the vehicle alternator of a high reliability.

(Second Example of Gear Ratio)

Second example of setting a gear ratio is as follows:
The number of teeth of each planetary gear 3 is 36;
The number of teeth of the internal gear 34 is 78; and
The number of teeth of field magnet rotating shaft 21 is 6.

FIG. 5 shows a relationship between the number of revolutions of the engine determined by another specified gear ratio described in the second example of setting the gear ratio and the number of revolutions of the vehicle alternator 1 of the embodiment.

On adapting the above set condition of the gear ratio of the second example and under the condition of a pulley ratio of 2, when the number of revolutions of the internal gear 34 is keep within a range of 408 rpm to 8,231 rpm, the number of revolutions of the field magnet rotating shaft 21 to the pulley 11 becomes a constant value 5,000 rpm regardless of the number of revolutions of the engine when the number of revolutions of the engine exceeds a specified number. That is, it is possible to set constant the number of revolutions of the field magnet rotating shaft 21 of the field magnet part 20 regardless of the number of revolutions of the engine.

Table 2 indicates the relationship shown in FIG. 5 between the number of revolutions of the vehicle alternator 1 and the number of revolutions of the engine. In Table 2, the speed increasing ration of the conventional case is 6.

TABLE 2

| | Number of revolutions of engine (rpm) | | | | | |
|---|---|---|---|---|---|---|
| | 8,000 | 6,000 | 4,000 | 2,000 | 1,500 | 750 |
| Number of revolutions of alternator | 5,000 | 4,800 | 5,200 | 4,400 | 4,500 | 5,190 |
| Number of revolutions of internal gear | 8,231 | 6,092 | 3,908 | 1,815 | 1,269 | 408 |

Because the field magnet part 20 of the vehicle alternator 1 of the embodiment is rotated at a constant speed, namely, at a constant number of revolutions by decreasing the speed changing ratio S to the increase of the number of revolutions of the engine, it is thereby possible to determine the upper limit value of centrifugal force to be applied to the component parts forming the vehicle alternator 1. This increases the reliability of the vehicle alternator 1 by performing the design based on the upper limit value of centrifugal force to be applied to the components forming the vehicle alternator 1.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A vehicle alternator for generating electric power that is driven by an engine through a driving belt, comprising:
    a pulley part joined to the engine through the driving belt and directly receiving a driving force supplied from the engine;
    a field magnet part located in separation from the pulley part in the vehicle alternator; and
    a rotation speed changing part located between the pulley part and the field magnet part, joining the pulley part with the field magnet part, and configured to convert the rotation speed between the pulley part and the field magnet part and reduce a speed changing ratio "S" according to increasing the rotation speed of the engine, where the speed changing ratio "S" is obtained by dividing the rotation speed of the field magnet part by the rotation speed of the pulley part,
    wherein the rotation speed changing part is comprised of a sun gear as a front part of a field magnet rotating shaft in the pulley part side of the field magnet part, planetary gears rotatably engaging with the sun gear, an internal gear rotatably engaging with an outside of the planetary gears, and an electric motor as a driving mechanism configured to drive the internal gear, and
    the number of revolution of the electric motor is controlled by an external control unit, and the speed changing ratio "S" is controlled by the external control unit through the electric motor,
    the rotation speed of the electric motor is changed when the external control unit changes the speed changing ratio "S", and the rotation speed of the internal gear is controlled by changing the rotation speed of the electric motor, and
    the speed changing ratio "S" is decreased according to increasing the rotation speed of the engine so that the rotation speed of the internal gear is decreased when the rotation speed of the engine is low, and increasing the rotation speed of the field magnet part is suppressed during increasing the rotation speed of the engine by increasing the rotation speed of the internal gear according to increasing the rotation speed of the engine.

2. The vehicle alternator according to claim 1, wherein the rotation speed changing part is configured to set the speed changing ratio "S" so that the rotation speed of the field magnet part becomes a constant value when the rotation speed of the engine exceeds a predetermined value according to the control by the external control unit.

3. The vehicle alternator according to claim 1, wherein the rotation speed changing part is configured to set the speed changing ratio "S" so that the rotation speed of the field magnet part is reduced according to increasing the rotation speed of the engine according to the control by the external control unit.

4. The vehicle alternator according to claim 1, wherein the electric motor directly drives the internal gear in the rotation speed changing part, and
    the external control unit controls the operation of the electric motor.

5. The vehicle alternator according to claim 1, wherein a gear ratio as a ratio of the number of teeth between the sun gear, each of the planetary gears, and the internal gear in the rotation speed changing part is 10:20:50.

6. The vehicle alternator according to claim 1, wherein a gear ratio as a ratio between the sun gear, each of the planetary gears, and the internal gear in the rotation speed changing part is 6:36:78.

* * * * *